US011266977B2

(12) United States Patent
Huennekes et al.

(10) Patent No.: US 11,266,977 B2
(45) Date of Patent: Mar. 8, 2022

(54) VANADIUM-BASED SELECTIVE CATALYTIC REDUCTION CATALYST

(71) Applicant: BASF Corporation, Florham Park, NJ (US)

(72) Inventors: Edgar Viktor Huennekes, Hannover (DE); Joseph A Patchett, Iselin, NJ (US); Petra Cordes, Hannover (DE); Kevin David Beard, Hannover (DE); Jan Martin Becker, Hannover (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/973,325

(22) PCT Filed: Jul. 30, 2019

(86) PCT No.: PCT/EP2019/070473
§ 371 (c)(1),
(2) Date: Dec. 8, 2020

(87) PCT Pub. No.: WO2020/025604
PCT Pub. Date: Feb. 6, 2020

(65) Prior Publication Data
US 2021/0362130 A1    Nov. 25, 2021

(30) Foreign Application Priority Data

Jul. 30, 2018 (EP) .................................. 18186280

(51) Int. Cl.
| | |
|---|---|
| *F01N 3/20* | (2006.01) |
| *F01N 3/28* | (2006.01) |
| *B01J 21/06* | (2006.01) |
| *B01J 23/22* | (2006.01) |
| *B01J 23/847* | (2006.01) |
| *B01J 35/04* | (2006.01) |
| *B01J 35/10* | (2006.01) |
| *B01J 37/02* | (2006.01) |
| *B01J 37/04* | (2006.01) |

(52) U.S. Cl.
CPC ............ *B01J 23/22* (2013.01); *B01J 21/063* (2013.01); *B01J 23/8472* (2013.01); *B01J 35/04* (2013.01); *B01J 35/1014* (2013.01); *B01J 37/0215* (2013.01); *F01N 3/2066* (2013.01); *F01N 3/2828* (2013.01); *F01N 2510/068* (2013.01)

(58) Field of Classification Search
CPC ............ B01D 46/2418; B01D 53/9418; B01D 53/9413; B01D 2255/20723; B01D 2255/40; B01D 2255/9155; B01D 2257/404; B01D 2258/012; B01J 23/22; B01J 37/0215; B01J 2523/55; F01N 3/035; F01N 2570/14; F01N 3/2066

See application file for complete search history.

(56) References Cited

U.S. PATENT DOCUMENTS

| | | | |
|---|---|---|---|
| 10,252,252 B2 * | 4/2019 | Bauer ...................... B01J 23/30 |
| 2001/0049339 A1 * | 12/2001 | Schafer-Sindlinger ...................... B01D 53/9418 502/350 |
| 2007/0129241 A1 * | 6/2007 | Schermanz .............. B01J 23/22 502/240 |
| 2013/0040808 A1 * | 2/2013 | Schermanz .......... B01J 23/8472 502/242 |
| 2015/0224486 A1 | 8/2015 | Bauer et al. |
| 2016/0288094 A1 * | 10/2016 | Malmberg ........... B01J 35/1014 |
| 2016/0288095 A1 * | 10/2016 | Suenobu ............ B01D 53/9418 |
| 2016/0288112 A1 | 10/2016 | Bauer et al. |
| 2018/0333698 A1 * | 11/2018 | Hoj ........................ F01N 3/022 |
| 2020/0306734 A1 * | 10/2020 | Arshad ................ B01J 37/0221 |
| 2020/0362740 A1 * | 11/2020 | Quinet ................... B01J 37/031 |
| 2021/0180500 A1 * | 6/2021 | Huennekes ............ B01J 29/763 |

FOREIGN PATENT DOCUMENTS

| | | |
|---|---|---|
| DE | 11 2013 000 477 T5 | 10/2014 |
| DE | 10 2015 205 843 A1 | 10/2016 |
| EP | 1 145 762 A1 | 10/2001 |
| WO | WO 2016/188989 A1 | 12/2016 |
| WO | WO 2018/121676 A1 | 7/2018 |

OTHER PUBLICATIONS

International Search Report dated Sep. 19, 2019 in PCT/EP2019/070473 filed on Jul. 30, 2019.
Casanova et al., "Mixed iron-erbium vanadate $NH_3$-SCR catalysts", Catalysis Today, 2015, vol. 241, pp. 159-168, XP055352693.

* cited by examiner

*Primary Examiner* — Timothy C Vanoy
(74) *Attorney, Agent, or Firm* — Finnegan, Henderson, Farabow, Garrett & Dunner LLP

(57) ABSTRACT

The present invention relates to a selective catalytic reduction catalyst for the treatment of an exhaust gas of a diesel engine comprising (i) a flow-through substrate comprising an inlet end, an outlet end, a substrate axial length extending from the inlet end to the outlet end and a plurality of passages defined by internal walls of the flow-through substrate extending therethrough; (II) a coating disposed on the surface of the internal walls of the substrate, where-in the surface defines the interface between the passages and the internal walls, wherein the coating comprises a vanadium oxide supported on an oxidic material comprising titania, and further comprises a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony.

15 Claims, No Drawings

VANADIUM-BASED SELECTIVE CATALYTIC REDUCTION CATALYST

The present invention relates to a selective catalytic reduction catalyst for the treatment of an exhaust gas of a diesel engine and to a process for preparing said catalyst. The present invention further relates to a selective catalytic reduction catalyst obtained or obtainable by said process and to exhaust gas treatment systems comprising the selective catalytic reduction catalyst of the present invention.

Vanadium-based selective catalytic reduction catalysts are used extensively for NOx abatement. Among the drawbacks of vanadium-based selective catalytic reduction (SCR) catalysts is the low temperature deNOx performance under NO only conditions, where the latest Cu-zeolite based SCR catalysts often offer better NOx conversion. For example, EP 1 145 762 discloses a process for preparing a vanadia selective catalytic reduction catalyst supported on titania. The process comprises dispersing titania in an ammonium metavanadate solution. The catalysts of EP 1 145 762 exhibit high NOx conversion only at high temperatures, namely at temperatures higher than 550° C.

Low-temperature deNOx is one of the most critical performance criteria for any NOx abatement catalyst and therefore this characteristic must be maximized. Typical pathways for vanadium-based SCR catalysts to increase low temperature deNOx are to increase vanadia loading (either via dry gain increase or higher vanadia concentration). The former has been exploited to its limit while the later reduces thermal stability during aging.

Therefore, it was an object of the present invention to provide a selective catalytic reduction catalyst which permits to exhibit high NOx conversion while maintaining or increasing its thermal stability. Surprisingly, it was found that the vanadium-based selective catalytic reduction catalyst according to the present invention permits to achieve high NOx conversion while maintaining or increasing its thermal stability.

Therefore, the present invention relates to a selective catalytic reduction catalyst for the treatment of an exhaust gas of a diesel engine comprising
(i) a flow-through substrate comprising an inlet end, an outlet end, a substrate axial length extending from the inlet end to the outlet end and a plurality of passages defined by internal walls of the flow-through substrate extending therethrough;
(ii) a coating disposed on the surface of the internal walls of the substrate, wherein the surface defines the interface between the passages and the internal walls, wherein the coating comprises a vanadium oxide supported on an oxidic material comprising titania, and further comprises a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony.

Preferably the vanadium oxide supported on the oxidic material is one or more of vanadium (II) oxide, vanadium (III) oxide, vanadium (IV) oxide and vanadium (V) oxide, more preferably one or more of vanadium (IV) oxide and vanadium (V) oxide.

It is preferred that the oxidic material further comprises one or more oxides, more preferably one or more of a cerium oxide, a magnesium oxide, a niobium oxide, a silicon oxide and a tungsten oxide, more preferably one or more of a cerium oxide, a silicon oxide and a tungsten oxide, more preferably one or more of a silicon oxide and a tungsten oxide.

It is more preferred that the one or more oxides, more preferably the tungsten oxide or more preferably the tungsten oxide and the silicon oxide, are impregnated on the titania.

Preferably from 75 to 100 weight-%, more preferably from 80 to 99 weight-%, more preferably from 85 to 95 weight-% of the oxidic material consist of titania.

Preferably from 98 to 100 weight-%, more preferably from 99 to 100 weight-%, more preferably from 99.5 to 100 weight-%, more preferably 99.9 to 100 weight-% of the oxidic material consist of titania and tungsten oxide, wherein more preferably from 80 to 99 weight-%, more preferably 85 to 95 weight-% of the oxidic material consist of titania and from 1 to 20 weight-%, more preferably from 5 to 15 weight-% of the oxidic material consist of tungsten oxide.

Alternatively, preferably from 98 to 100 weight-%, more preferably from 99 to 100 weight-%, more preferably from 99.5 to 100 weight-%, more preferably 99.9 to 100 weight-% of the oxidic material consist of titania, tungsten oxide and silicon oxide, wherein more preferably from 80 to 98 weight-%, more preferably from 83 to 93 weight-% of the oxidic material consist of titania and from 1 to 20 weight-%, more preferably from 5 to 12 weight-% of the oxidic material consist of tungsten oxide, and from 1 to 15 weight-%, more preferably from 2 to 8 weight-% of the oxidic material consist of silicon oxide.

Therefore, the present invention preferably relates to a selective catalytic reduction catalyst for the treatment of an exhaust gas of a diesel engine comprising
(i) a flow-through substrate comprising an inlet end, an outlet end, a substrate axial length extending from the inlet end to the outlet end and a plurality of passages defined by internal walls of the flow-through substrate extending therethrough;
(ii) a coating disposed on the surface of the internal walls of the substrate, wherein the surface defines the interface between the passages and the internal walls, wherein the coating comprises a vanadium oxide, which is one or more of vanadium (IV) oxide and vanadium (V) oxide, supported on an oxidic material comprising titania, wherein from 85 to 95 weight-% of the oxidic material consist of titania, and further comprises a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony.

In the context of the present invention, it is preferred that from 80 to 95 weight-%, more preferably from 80 to 90 weight-% of the coating consist of the oxidic material.

As to the mixed oxide, it is preferred that the vanadium of the mixed oxide is one or more of vanadium (IV) and vanadium (V).

As to the mixed oxide, it is preferred that the mixed oxide is a mixed oxide of vanadium and one or more of iron, erbium, bismuth, aluminum, and antimony, more preferably one or more of iron, erbium, bismuth, and antimony, more preferably one or more of iron and antimony. The mixed oxide is more preferably a mixed oxide of vanadium and iron. Thus, it is preferred that the coating comprises a mixed oxide of vanadium and iron.

It is preferred that the vanadium oxide, calculated as $V_2O_5$, is present in the catalyst at a loading (lv1)/(g/in$^3$), and the vanadium of the mixed oxide, calculated as $V_2O_5$, is present in the catalyst at a loading (lv2)/(g/in$^3$), wherein the ratio (lv1):(lv2) is in the range of from 0.1:1 to 3:1, more preferably in the range of from 0.1:1 to 2:1, more preferably in the range of from 0.2:1 to 1.5:1. It is more preferred that the ratio (lv1):(lv2) is in the range of from 0.2:1 to 1.3:1.

Therefore, the present invention preferably relates to a selective catalytic reduction catalyst for the treatment of an exhaust gas of a diesel engine comprising (i) a flow-through substrate comprising an inlet end, an outlet end, a substrate axial length extending from the inlet end to the outlet end and a plurality of passages defined by internal walls of the flow-through substrate extending therethrough;

(ii) a coating disposed on the surface of the internal walls of the substrate, wherein the surface defines the interface between the passages and the internal walls, wherein the coating comprises a vanadium oxide supported on an oxidic material comprising titania, and further comprises a mixed oxide of vanadium and one or more of iron, erbium, bismuth, and antimony;

wherein the vanadium oxide, calculated as $V_2O_5$, is present in the catalyst at a loading (lv1)/(g/in$^3$), and the vanadium of the mixed oxide, calculated as $V_2O_5$, is present in the catalyst at a loading (lv2)/(g/in$^3$), wherein the ratio (lv1):(lv2) is in the range of from 0.1:1 to 3:1, more preferably in the range of from 0.1:1 to 2:1.

According to the present invention, it is preferred that in the mixed oxide of vanadium and the one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, the molar ratio of the one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, to the vanadium, X:V, is in the range of from 1:1.5 to 1.5:1, more preferably in the range of from 1:1.2 to 1.2:1, more preferably in the range of from 1:1.1 to 1.1:1. More preferably, in the mixed oxide of vanadium and iron, the molar ratio of iron to vanadium is in the range of from 1:1.5 to 1.5:1, more preferably in the range of from 1:1.2 to 1.2:1, more preferably in the range of from 1:1.1 to 1.1:1.

It is preferred that the amount of vanadium comprised in the coating, the vanadium being calculated as $V_2O_5$, is in the range of from 2.5 to 8 weight-%, more preferably in the range of from 3 to 7 weight-%, more preferably in the range of from 3.5 to 6.5 weight-%, based on the total weight of the coating. In the context of the present invention, the amount of vanadium represents the amount of vanadium from the vanadium oxide and of vanadium from the mixed oxide.

According to the present invention, it is preferred that, in the catalyst, the vanadium oxide is present at a loading in the range of 0.02 to 0.5 g/in$^3$, more preferably in the range of from 0.03 to 0.2 g/in$^3$, more preferably in the range of from 0.04 to 0.15 g/in$^3$.

It is preferred that, in the catalyst, the oxidic material is present at a loading in the range of from 1 to 8 g/in$^3$, more preferably in the range of from 1.5 to 5 g/in$^3$, more preferably in the range of from 2 to 4.5 g/in$^3$, more preferably in the range of from 3 to 4.5 g/in$^3$.

Thus, it is more preferred that, in the catalyst, the vanadium oxide is present at a loading in the range of from 0.02 to 0.5 g/in$^3$ and that the oxidic material is present at a loading in the range of from 1.5 to 5 g/in$^3$.

It is preferred that, in the catalyst, the mixed oxide is present at a loading in the range of from 0.05 to 1 g/in$^3$, more preferably in the range of from 0.08 to 0.7 g/in$^3$, more preferably in the range of from 0.1 to 0.5 g/in$^3$.

It is preferred that the coating further comprises an oxidic binder, wherein the oxidic binder more preferably comprises one or more of zirconia, alumina, titania, silica and a mixed oxide comprising two or more of Zr, Al, Ti and Si. It is more preferred that the oxidic binder comprises one or more of alumina and silica, more preferably silica. More preferably in the catalyst, the coating comprises the oxidic binder at a loading in the range of from 0.02 to 0.5 g/in$^3$, more preferably in the range of from 0.05 to 0.4 g/in$^3$, more preferably in the range of from 0.1 to 0.3 g/in$^3$.

Preferably from 98 to 100 weight-%, more preferably from 99 to 100 weight-%, more preferably from 99.5 to 100 weight-%, more preferably from 99.9 to 100 weight-% of the coating consist of the vanadium oxide, the oxidic material comprising titania, the mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony and preferably the oxidic binder as defined in the foregoing. More preferably from 98 to 100 weight-%, more preferably from 99 to 100 weight-%, more preferably from 99.5 to 100 weight %, more preferably from 99.9 to 100 weight-% of the coating consist of the vanadium oxide, the oxidic material comprising titania, the mixed oxide of vanadium and iron and an oxidic binder comprising silica.

It is preferred that, in the catalyst, the coating is present at a loading in the range of from 1.5 to 10 g/in$^3$, more preferably in the range of from 2 to 8 g/in$^3$, more preferably in the range of from 2.5 to 6.5 g/in$^3$, more preferably in the range of 3 to 6 g/in$^3$, more preferably in the range of from 3.5 to 6 g/in$^3$.

Preferably from 99 to 100 weight-%, more preferably from 99.5 to 100 weight-%, more preferably from 99.9 to 100 weight-% of the vanadium oxide consist of vanadium and oxygen. It is preferred that the vanadium oxide consists of vanadium and oxygen.

Preferably from 0 to 0.001 weight-%, more preferably from 0 to 0.0001 weight-%, more preferably from 0 to 0.00001 weight-% of the coating consist of a zeolitic material. More preferably, the coating is free of a zeolitic material.

Preferably from 0 to 0.001 weight-%, more preferably from 0 to 0.0001 weight-%, more preferably from 0 to 0.00001 weight-% of the coating consist of palladium and platinum, more preferably of palladium, platinum and rhodium, more preferably of palladium, platinum, rhodium, iridium and osmium, more preferably of noble metals. It is more preferred that the coating is free of noble metals.

It is preferred that the coating covers from 95 to 100%, more preferably from 98 to 100%, more preferably from 99 to 100% of the substrate axial length.

As to the substrate, it is preferred that the flow-through substrate of the catalyst comprises a ceramic or metallic substance.

As to the substrate, it is preferred that the flow-through substrate of the catalyst comprises, more preferably consists of, a ceramic substance, wherein the ceramic substance more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite, more preferably a cordierite. As an alternative, it is preferred that the flow-through substrate of the catalyst comprises, more preferably consists of, a metallic substance, wherein the metallic substance more preferably comprises, more preferably consists of, oxygen and one or more of iron, chromium, and aluminum.

Preferably from 98 to 100 weight-%, more preferably from 99 to 100 weight-%, more preferably from 99.5 to 100 weight-%, more preferably from 99.9 to 100 weight-% of the catalyst consist of the flow-through substrate and the coating.

In the context of the present invention, it is preferred that the coating according to (ii) comprises two or more coats, more preferably consists of two coats. More preferably, the two or more coats have the same chemical composition.

The present invention further relates to a process for preparing a selective catalytic reduction catalyst, preferably the selective catalytic reduction catalyst according to the present invention, comprising
(a) providing a flow-through substrate comprising an inlet end, an outlet end, a substrate axial length extending from the inlet end to the outlet end and a plurality of passages defined by internal walls of the flow-through substrate extending therethrough;
(b) providing a slurry comprising a solution of vanadium oxide, a powder of an oxidic material comprising titania, water, a powder of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, and preferably an oxidic binder, more preferably an oxidic binder as defined in the foregoing;
(c) disposing the slurry obtained in (b) on the surface of the internal walls of the flow-through substrate according to (a), wherein the surface defines the interface between the passages and the internal walls, obtaining a slurry-treated substrate;
(d) optionally drying the slurry-treated substrate obtained in (c);
(e) calcining the slurry-treated substrate obtained in (c), or the dried slurry-treated substrate obtained in (d), obtaining a coated substrate;
and optionally
(c') disposing the slurry obtained in (b) on the surface of the coating disposed on the substrate as obtained in (e);
(d') optionally drying the slurry-treated substrate obtained in (c');
(e') calcining the slurry-treated substrate obtained in (c'), or the dried slurry-treated substrate obtained in (d');
wherein from (e) or (e'), the selective catalytic reduction catalyst is obtained.

As to (b), it is preferred that it comprises
(b.1) mixing the solution of vanadium oxide, water, the powder of an oxidic material comprising titania, and preferably an organic dispersant, obtaining a slurry;
(b.2) adjusting the pH of the aqueous phase of the slurry obtained in (b.1) to a value in the range of from 6 to 8, more preferably in the range of from 6.5 to 7.5, and more preferably by adding an ammonium hydroxide solution;
(b.3) adding the powder of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, to the slurry obtained in (b.2);
(b.4) more preferably adding an oxidic binder to the mixture obtained in (b.3), obtaining a final slurry.

As to (c), it is preferred that it comprises disposing the slurry over 95 to 100%, more preferably 98 to 100%, more preferably 99 to 100% of the substrate axial length.

According to the present invention, disposing the slurry according to (c) is preferably performed by spraying or immerging the substrate.

According to (d), it is preferred that the slurry-treated substrate obtained in (c) is dried in a gas atmosphere at a temperature in the range of from 90 to 160° C., more preferably in the range of from 110 to 130° C.

According to (d), it is preferred that the slurry-treated substrate obtained in (c) is dried in a gas atmosphere for a duration in the range of from 10 to 30 minutes.

It is preferred that the dried slurry-treated substrate obtained in (d) has a water content in the range of from 0 to 30%, more preferably in the range of from 5 to 25%, more preferably in the range of from 15 to 20%.

As to (d), it is preferred that the gas atmosphere comprises, more preferably is, one or more of air, lean air, and oxygen, more preferably air.

According to (e), it is preferred that the slurry-treated substrate obtained in (c), or the dried slurry-treated substrate obtained in (d), is calcined in a gas atmosphere at a temperature in the range of from 300 to 600° C., more preferably in the range of from 400 to 500° C.

According to (e), it is preferred that the slurry-treated substrate obtained in (c), or the substrate having a coating disposed thereon obtained in (d), is calcined in a gas atmosphere for a duration in the range of from 2 to 6 hours, more preferably in the range of from 3 to 5 hours.

As to (e), it is preferred that the gas atmosphere comprises, more preferably is, one or more of air, lean air, and oxygen, more preferably air.

Therefore, the present invention preferably relates to a process for preparing a selective catalytic reduction catalyst, preferably the selective catalytic reduction catalyst according to the present invention, comprising
(a) providing a flow-through substrate comprising an inlet end, an outlet end, a substrate axial length extending from the inlet end to the outlet end and a plurality of passages defined by internal walls of the flow-through substrate extending therethrough;
(b) providing a slurry comprising a solution of vanadium oxide, a powder of an oxidic material comprising titania, water, a powder of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, and preferably an oxidic binder, wherein (b) comprises
(b.1) mixing the solution of vanadium oxide, water, the powder of an oxidic material comprising titania, and preferably an organic dispersant, obtaining a slurry;
(b.2) adjusting the pH of the aqueous phase of the slurry obtained in (b.1) to a value in the range of from 6 to 8, more preferably in the range of from 6.5 to 7.5, and more preferably by adding an ammonium hydroxide solution;

(b.3) adding the powder of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, to the slurry obtained in (b.2);

(b.4) more preferably adding an oxidic binder to the mixture obtained in (b.3), obtaining a final slurry;

(c) disposing the slurry obtained in (b.3), more preferably in (b.4), on the surface of the internal walls of the flow-through substrate according to (a) by spraying or immerging the substrate, wherein the surface defines the interface between the passages and the internal walls, obtaining a slurry-treated substrate;

(d) optionally drying the slurry-treated substrate obtained in (c);

(e) calcining the slurry-treated substrate obtained in (c), or the dried slurry-treated substrate obtained in (d) in a gas atmosphere at a temperature in the range of from 300 to 600° C., obtaining a coated substrate;

and optionally (c') disposing the slurry obtained in (b) on the surface of the coating disposed on the substrate as obtained in (e);

(d') optionally drying the slurry-treated substrate obtained in (c');

(e') calcining the slurry-treated substrate obtained in (c'), or the dried slurry-treated substrate obtained in (d');

wherein from (e) or (e'), the selective catalytic reduction catalyst is obtained.

In the context of the present invention, it is preferred that (c') comprises disposing the slurry over 95 to 100%, more preferably 98 to 100%, more preferably 99 to 100% of the substrate axial length.

According to the present invention, disposing the slurry according to (c') is preferably performed by spraying or immersing the substrate.

According to (d'), it is preferred that the slurry-treated substrate obtained in (c') is dried in a gas atmosphere at a temperature in the range of from 90 to 160° C., more preferably in the range of from 110 to 150° C.

According to (d'), it is preferred that the slurry-treated substrate obtained in (c') is dried in a gas atmosphere for a duration in the range of from 10 to 30 minutes.

It is preferred that the dried slurry-treated substrate obtained in (d') has a water content in the range of from 0 to 30%, more preferably in the range of from 5 to 25%, more preferably in the range of from 15 to 20%.

As to (d'), it is preferred that the gas atmosphere comprises, more preferably is, one or more of air, lean air, and oxygen, more preferably air.

According to (e'), it is preferred that the slurry-treated substrate obtained in (c'), or the dried slurry-treated substrate obtained in (d'), is calcined in a gas atmosphere at a temperature in the range of from 300 to 600° C., more preferably in the range of from 400 to 500° C.

According to (e'), it is preferred that the slurry-treated substrate obtained in (c'), or the dried slurry-treated substrate obtained in (d'), is calcined in a gas atmosphere for a duration in the range of from 2 to 6 hours, more preferably in the range of from 3 to 5 hours.

As to (e'), it is preferred that the gas atmosphere comprises, more preferably is, one or more of air, lean air, and oxygen, more preferably air.

It is particularly preferred that the process consists of (a) providing a flow-through substrate comprising an inlet end, an outlet end, a substrate axial length extending from the inlet end to the outlet end and a plurality of passages defined by internal walls of the flow-through substrate extending therethrough;

(b) providing a slurry comprising a solution of vanadium oxide, a powder of an oxidic material comprising titania, water, a powder of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, and preferably an oxidic binder, more preferably an oxidic binder as defined in the foregoing;

(c) disposing the slurry obtained in (b) on the surface of the internal walls of the flow-through substrate according to (a), wherein the surface defines the interface between the passages and the internal walls, obtaining a slurry-treated substrate;

(d) optionally drying the slurry-treated substrate obtained in (c);

(e) calcining the slurry-treated substrate obtained in (c), or the dried slurry-treated substrate obtained in (d), obtaining a coated substrate;

and optionally (c') disposing the slurry obtained in (b) on the surface of the coating disposed on the substrate as obtained in (e);

(d') optionally drying the slurry-treated substrate obtained in (c');

(e') calcining the slurry-treated substrate obtained in (c'), or the dried slurry-treated substrate obtained in (d');

wherein from (e) or (e'), the selective catalytic reduction catalyst is obtained.

The present invention further relates to a selective catalytic reduction catalyst, preferably the selective catalytic reduction catalyst according to the present invention, obtainable or obtained by the process according to the present invention.

The present invention further relates to an exhaust gas treatment system for treating an exhaust gas stream exiting from a diesel engine, comprising a first selective catalytic reduction catalyst according to the present invention, and one or more of a diesel oxidation catalyst, an ammonia oxidation catalyst, a second selective catalytic reduction catalyst, a filter, preferably a catalyzed soot filter.

According to a first aspect of the present invention, it is preferred that the first selective catalytic reduction catalyst according to the present invention, comprises an inlet end and an outlet end, the inlet end of said first selective catalytic reduction catalyst being in fluid communication with and downstream of the diesel engine, wherein the system further comprises an ammonia oxidation catalyst having an inlet end and an outlet end;

a diesel oxidation catalyst having an inlet end and an outlet end;

a filter, more preferably a catalyzed soot filter, having an inlet end and an outlet end;

wherein the outlet end of the first selective catalytic reduction catalyst is located upstream of the inlet end of the ammonia oxidation catalyst, the outlet end of the ammonia oxidation catalyst is located upstream of the inlet end of the diesel oxidation catalyst, and the outlet end of the diesel oxidation catalyst is located upstream of the inlet end of the filter.

According to the first aspect of the present invention, it is preferred that the system further comprises downstream of the outlet end of the filter, a second selective catalytic reduction catalyst, more preferably a selective catalytic reduction catalyst according to the present invention, having an inlet end and an outlet end, and a second ammonia oxidation catalyst having an inlet end and an outlet end, wherein the inlet end of the second ammonia oxidation catalyst is located downstream of the outlet end of the second selective catalytic reduction catalyst.

According to a second aspect of the present invention, it is preferred that the system comprises a diesel oxidation catalyst having an inlet end and an outlet end, the inlet end of the diesel oxidation catalyst being in fluid communication with and downstream of the diesel engine; a filter, preferably a catalyzed soot filter, having an inlet end and an outlet end, wherein the inlet end of the filter is located downstream of the outlet end of the diesel oxidation catalyst; wherein the first selective catalytic reduction catalyst according to the present invention, has an inlet end and an outlet end, wherein the inlet end of said first selective catalytic reduction catalyst is located downstream of the outlet end of the filter.

According to the second aspect of the present invention, it is preferred that the exhaust gas treatment system further comprises an ammonia oxidation catalyst having an inlet end and an outlet end, wherein the inlet end of the ammonia oxidation catalyst is located downstream of the outlet end of the first selective catalytic reduction catalyst.

In the context of the present invention, it is preferred that the system further comprises one or more fluid injectors, each being located upstream of a selective catalytic reduction catalyst, wherein the fluid is more preferably urea.

The present invention further relates to a use of a selective catalytic reduction catalyst according to the present invention, for the selective catalytic reduction of nitrogen oxides comprised in an exhaust gas stream, more preferably from a diesel engine.

The present invention further relates to a method for the selective catalytic reduction of nitrogen oxides, wherein the nitrogen oxides are comprised in an exhaust gas stream, said method comprising
(1) providing the exhaust gas stream, preferably from a diesel engine;
(2) passing the exhaust gas stream provided in (1) through a selective catalytic reduction catalyst according to the present invention.

The present invention is illustrated by the following set of embodiments and combinations of embodiments resulting from the dependencies and back-references as indicated. In particular, it is noted that in each instance where a range of embodiments is mentioned, for example in the context of a term such as "The selective catalytic reduction catalyst of any one of embodiments 1 to 4", every embodiment in this range is meant to be explicitly disclosed for the skilled person, i.e. the wording of this term is to be understood by the skilled person as being synonymous to "The selective catalytic reduction catalyst of any one of embodiments 1, 2, 3 and 4". Further, it is explicitly noted that the following set of embodiments is not the set of claims determining the extent of protection, but represents a suitably structured part of the description directed to general and preferred aspects of the present invention.

1. A selective catalytic reduction catalyst for the treatment of an exhaust gas of a diesel engine comprising
   (i) a flow-through substrate comprising an inlet end, an outlet end, a substrate axial length extending from the inlet end to the outlet end and a plurality of passages defined by internal walls of the flow-through substrate extending therethrough;
   (ii) a coating disposed on the surface of the internal walls of the substrate, wherein the surface defines the interface between the passages and the internal walls, wherein the coating comprises a vanadium oxide supported on an oxidic material comprising titania, and further comprises a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony.
2. The selective catalytic reduction catalyst of embodiment 1, wherein the vanadium oxide supported on the oxidic material is one or more of vanadium (II) oxide, vanadium (III) oxide, vanadium (IV) oxide and vanadium (V) oxide, preferably one or more of vanadium (IV) oxide and vanadium (V) oxide.
3. The selective catalytic reduction catalyst of embodiment 1 or 2, wherein the oxidic material further comprises one or more oxides, preferably one or more of a cerium oxide, a magnesium oxide, a niobium oxide, a silicon oxide and a tungsten oxide, preferably one or more of a cerium oxide, a silicon oxide and a tungsten oxide, more preferably one or more of a silicon oxide and a tungsten oxide.
4. The selective catalytic reduction catalyst of embodiment 3, wherein the one or more oxides, preferably the tungsten oxide or preferably the tungsten oxide and the silicon oxide, are impregnated on the titania.
5. The selective catalytic reduction catalyst of any one of embodiments 1 to 4, wherein from 75 to 100 weight-%, preferably from 80 to 99 weight-%, more preferably from 85 to 95 weight-% of the oxidic material consist of titania.
6. The selective catalytic reduction catalyst of any one of embodiments 1 to 5, wherein from 98 to 100 weight-%, preferably from 99 to 100 weight-%, more preferably from 99.5 to 100 weight-%, more preferably 99.9 to 100 weight-% of the oxidic material consist of titania and tungsten oxide, wherein more preferably from 80 to 99 weight-%, more preferably 85 to 95 weight-% of the oxidic material consist of titania and from 1 to 20 weight-%, more preferably from 5 to 15 weight-% of the oxidic material consist of tungsten oxide.
7. The selective catalytic reduction catalyst of any one of embodiments 1 to 5, wherein from 98 to 100 weight-%, preferably from 99 to 100 weight-%, more preferably from 99.5 to 100 weight-%, more preferably 99.9 to 100 weight-% of the oxidic material consist of titania, tungsten oxide and silicon oxide, wherein more preferably from 80 to 98 weight-%, more preferably from 83 to 93 weight-% of the oxidic material consist of titania and from 1 to 20 weight-%, more preferably from 5 to 12 weight-% of the oxidic material consist of tungsten oxide, and from 1 to 15 weight-%, more preferably from 2 to 8 weight-% of the oxidic material consist of silicon oxide.
8. The selective catalytic reduction catalyst of any one of embodiments 1 to 7, wherein from 80 to 95 weight-%, preferably from 80 to 90 weight-% of the coating consist of the oxidic material.

9. The selective catalytic reduction catalyst of any one of embodiments 1 to 8, wherein the vanadium of the mixed oxide is one or more of vanadium (IV) and vanadium (V).

10. The selective catalytic reduction catalyst of any one of embodiments 1 to 9, wherein the mixed oxide is a mixed oxide of vanadium and one or more of iron, erbium, bismuth, aluminum, and antimony, preferably one or more of iron, erbium, bismuth, and antimony, more preferably one or more of iron and antimony, more preferably iron.

11. The selective catalytic reduction catalyst of embodiment 10, wherein the coating comprises a mixed oxide of vanadium and iron.

12. The selective catalytic reduction catalyst of any one of embodiments 1 to 11, wherein the vanadium oxide, calculated as $V_2O_5$, is present in the catalyst at a loading $(lv1)/(g/in^3)$, and the vanadium of the mixed oxide, calculated as $V_2O_5$, is present in the catalyst at a loading $(lv2)/(g/in^3)$,
wherein the ratio (lv1):(lv2) is in the range of from 0.1:1 to 3:1, preferably in the range of from 0.1:1 to 2:1, more preferably in the range of from 0.2:1 to 1.5:1, more preferably in the range of from 0.2:1 to 1.3:1.

13. The selective catalytic reduction catalyst of any one of embodiments 1 to 12, wherein in the mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, the molar ratio of the one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, to the vanadium, X:V, is in the range of from 1:1.5 to 1.5:1, preferably in the range of from 1:1.2 to 1.2:1, more preferably in the range of from 1:1.1 to 1.1:1.

14. The selective catalytic reduction catalyst of any one of embodiments 1 to 13, wherein the amount of vanadium comprised in the coating, the vanadium being calculated as $V_2O_5$, is in the range of from 2.5 to 8 weight-%, more preferably in the range of from 3 to 7 weight %, more preferably in the range of from 3.5 to 6.5 weight-%, based on the total weight of the coating.

15. The selective catalytic reduction catalyst of any one of embodiments 1 to 14, wherein in the catalyst, the vanadium oxide is present at a loading in the range of 0.02 to 0.5 g/in$^3$, preferably in the range of from 0.03 to 0.2 g/in$^3$, more preferably in the range of from 0.04 to 0.15 g/in$^3$.

16. The selective catalytic reduction catalyst of any one of embodiments 1 to 15, wherein in the catalyst, the oxidic material is present at a loading in the range of from 1 to 8 g/in$^3$, preferably in the range of from 1.5 to 5 g/in$^3$, more preferably in the range of from 2 to 4.5 g/in$^3$, more preferably in the range of from 3 to 4.5 g/in$^3$.

17. The selective catalytic reduction catalyst of any one of embodiments 1 to 16, wherein in the catalyst, the mixed oxide is present at a loading in the range of from 0.05 to 1 g/in$^3$, preferably in the range of from 0.08 to 0.7 g/in$^3$, more preferably in the range of from 0.1 to 0.5 g/in$^3$.

18. The selective catalytic reduction catalyst of any one of embodiments 1 to 17, wherein the coating further comprises an oxidic binder, wherein the oxidic binder preferably comprises one or more of zirconia, alumina, titania, silica and a mixed oxide comprising two or more of Zr, Al, Ti and Si, wherein the oxidic binder more preferably comprises one or more of alumina and silica, more preferably silica.

19. The selective catalytic reduction catalyst of embodiment 18, wherein in the catalyst, the coating comprises the oxidic binder at a loading in the range of from 0.02 to 0.5 g/in$^3$, preferably in the range of from 0.05 to 0.4 g/in$^3$, more preferably in the range of from 0.1 to 0.3 g/in$^3$.

20. The selective catalytic reduction catalyst of any one of embodiments 1 to 19, wherein from 98 to 100 weight-%, preferably from 99 to 100 weight-%, more preferably from 99.5 to 100 weight-%, more preferably from 99.9 to 100 weight-% of the coating consist of the vanadium oxide, the oxidic material comprising titania, the mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony and preferably the oxidic binder according to embodiment 18 or 19.

21. The selective catalytic reduction catalyst of any one of embodiments 1 to 20, wherein in the catalyst, the coating is present at a loading in the range of from 1.5 to 10 g/in$^3$, preferably in the range of from 2 to 8 g/in$^3$, more preferably in the range of from 2.5 to 6.5 g/in$^3$, more preferably in the range of 3 to 6 g/in$^3$, more preferably in the range of 3.5 to 6 g/in$^3$.

22. The selective catalytic reduction catalyst of any one of embodiments 1 to 21, wherein from 99 to 100 weight-%, preferably from 99.5 to 100 weight-%, more preferably from 99.9 to 100 weight-% of the vanadium oxide consist of vanadium and oxygen.

23. The selective catalytic reduction catalyst of any one of embodiments 1 to 22, wherein the vanadium oxide consists of vanadium and oxygen.

24. The selective catalytic reduction catalyst of any one of embodiments 1 to 23, wherein from 0 to 0.001 weight-%, preferably from 0 to 0.0001 weight-%, more preferably from 0 to 0.00001 weight-% of the coating consist of a zeolitic material.

25. The selective catalytic reduction catalyst of embodiment 24 wherein the coating is free of a zeolitic material.

26. The selective catalytic reduction catalyst of any one of embodiments 1 to 25, wherein from 0 to 0.001 weight-%, preferably from 0 to 0.0001 weight-%, more preferably from 0 to 0.00001 weight-% of the coating consist of palladium and platinum, preferably of palladium, platinum and rhodium, more preferably of palladium, platinum, rhodium, iridium and osmium, more preferably of noble metals.

27. The selective catalytic reduction catalyst of embodiment 26, wherein the coating is free of noble metals.

28. The selective catalytic reduction catalyst of any one of embodiments 1 to 27, wherein the coating covers from 95 to 100%, preferably from 98 to 100%, more preferably from 99 to 100% of the substrate axial length.

29. The selective catalytic reduction catalyst of any one of embodiments 1 to 28, wherein the flow-through substrate of the catalyst comprises a ceramic or metallic substance.

30. The selective catalytic reduction catalyst of any one of embodiments 1 to 29, wherein the flow-through substrate of the catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite; or wherein the flow-through substrate of the catalyst comprises, preferably consists of, a metallic substance, wherein the metallic substance preferably comprises, more preferably consists of, oxygen and one or more of iron, chromium, and aluminum.

31. The selective catalytic reduction catalyst of any one of embodiments 1 to 30, wherein from 98 to 100 weight-%, preferably from 99 to 100 weight-%, more preferably from 99.5 to 100 weight-%, more preferably from 99.9 to 100 weight-% of the catalyst consist of the flow-through substrate and the coating.

32. The selective catalytic reduction catalyst of any one of embodiments 1 to 31, wherein the coating according to (ii) comprises two or more coats, preferably consists of two coats.

33. The selective catalytic reduction catalyst of embodiment 32, wherein the two or more coats have the same chemical composition.

34. A process for preparing a selective catalytic reduction catalyst, preferably the selective catalytic reduction catalyst according to any one of embodiments 1 to 33, comprising
   (a) providing a flow-through substrate comprising an inlet end, an outlet end, a substrate axial length extending from the inlet end to the outlet end and a plurality of passages defined by internal walls of the flow-through substrate extending therethrough;
   (b) providing a slurry comprising a solution of vanadium oxide, a powder of an oxidic material comprising titania, water, a powder of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, and preferably an oxidic binder;
   (c) disposing the slurry obtained in (b) on the surface of the internal walls of the flow-through substrate according to (a), wherein the surface defines the interface between the passages and the internal walls, obtaining a slurry-treated substrate; (d) optionally drying the slurry-treated substrate obtained in (c);
   (e) calcining the slurry-treated substrate obtained in (c), or the dried slurry-treated substrate obtained in (d), obtaining a coated substrate;
   and optionally
   (c') disposing the slurry obtained in (b) on the surface of the coating disposed on the substrate as obtained in (e);
   (d') optionally drying the slurry-treated substrate obtained in (c');
   (e') calcining the slurry-treated substrate obtained in (c'), or the dried slurry-treated substrate obtained in (d');
   wherein from (e) or (e'), the selective catalytic reduction catalyst is obtained.

35. The process of embodiment 34, wherein (b) comprises
   (b.1) mixing the solution of vanadium oxide, water, the powder of an oxidic material comprising titania, and preferably an organic dispersant, obtaining a slurry;
   (b.2) adjusting the pH of the aqueous phase of the slurry obtained in (b.1) to a value in the range of from 6 to 8, preferably in the range of 6.5 to 7.5, and preferably by adding an ammonium hydroxide solution;
   (b.3) adding the powder of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, to the slurry obtained in (b.2);
   (b.4) preferably adding an oxidic binder to the mixture obtained in (b.3), obtaining a final slurry.

36. The process of embodiment 34 or 35, wherein (c) comprises disposing the slurry over 95 to 100%, preferably 98 to 100%, more preferably 99 to 100% of the substrate axial length.

37. The process of any one of embodiments 34 to 36, wherein disposing the slurry according to (c) is performed by spraying or immerging the substrate.

38. The process of any one of embodiments 34 to 37, wherein according to (d), the slurry-treated substrate obtained in (c) is dried in a gas atmosphere at a temperature in the range of from 90 to 160° C., preferably in the range of from 110 to 130° C.

39. The process of any one of embodiments 34 to 38, wherein according to (d), the slurry-treated substrate obtained in (c) is dried in a gas atmosphere for a duration in the range of from 10 to 30 minutes.

40. The process of any one of embodiments 34 to 39, wherein the dried slurry-treated substrate obtained in (d) has a water content in the range of from 0 to 30%, preferably in the range of from 5 to 25%, more preferably in the range of from 15 to 20%.

41. The process of any one of embodiments 38 to 40, wherein the gas atmosphere comprises, preferably is, one or more of air, lean air, and oxygen, more preferably air.

42. The process of any one of embodiments 34 to 41, wherein according to (e), the slurry-treated substrate obtained in (c), or the dried slurry-treated substrate obtained in (d), is calcined in a gas atmosphere at a temperature in the range of from 300 to 600° C., preferably in the range of from 400 to 500° C.

43. The process of any one of embodiments 34 to 42, wherein according to (e), the slurry-treated substrate obtained in (c), or the substrate having a coating disposed thereon obtained in (d), is calcined in a gas atmosphere for a duration in the range of from 2 to 6 hours, preferably in the range of from 3 to 5 hours.

44. The process of embodiment 42 or 43, wherein the gas atmosphere comprises, preferably is, one or more of air, lean air, and oxygen, more preferably air.

45. The process of any one of embodiments 34 to 44, wherein (c') comprises disposing the slurry over 95 to 100%, preferably 98 to 100%, more preferably 99 to 100% of the substrate axial length.

46. The process of any one of embodiments 34 to 45, wherein disposing the slurry according to (c') is performed by spraying or immersing the substrate.

47. The process of any one of embodiments 34 to 46, wherein according to (d'), the slurry-treated substrate obtained in (c') is dried in a gas atmosphere at a temperature in the range of from 90 to 160° C., preferably in the range of from 110 to 150° C.

48. The process of any one of embodiments 34 to 47, wherein according to (d'), the slurry-treated substrate obtained in (c') is dried in a gas atmosphere for a duration in the range of from 10 to 30 minutes.

49. The process of any one of embodiments 34 to 48, wherein the dried slurry-treated substrate obtained in (d')

has a water content in the range of from 0 to 30%, preferably in the range of from 5 to 25%, more preferably in the range of from 15 to 20%.

50. The process of any one of embodiments 47 to 49, wherein the gas atmosphere comprises, preferably is, one or more of air, lean air, and oxygen, more preferably air.

51. The process of any one of embodiments 34 to 50, wherein according to (e'), the slurry-treated substrate obtained in (c'), or the dried slurry-treated substrate obtained in (d'), is calcined in a gas atmosphere at a temperature in the range of from 300 to 600° C., preferably in the range of from 400 to 500° C.

52. The process of any one of embodiments 34 to 51, wherein according to (e'), the slurry-treated substrate obtained in (c'), or the dried slurry-treated substrate obtained in (d'), is calcined in a gas atmosphere for a duration in the range of from 2 to 6 hours, preferably in the range of from 3 to 5 hours.

53. The process of embodiment 51 or 52, wherein the gas atmosphere comprises, preferably is, one or more of air, lean air, and oxygen, more preferably air.

54. The process of any of embodiments 34 to 53 consisting of
   (a) providing a flow-through substrate comprising an inlet end, an outlet end, a substrate axial length extending from the inlet end to the outlet end and a plurality of passages defined by internal walls of the flow-through substrate extending therethrough;
   (b) providing a slurry comprising a solution of vanadium oxide, a powder of an oxidic material comprising titania, water, a powder of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, and preferably an oxidic binder;
   (c) disposing the slurry obtained in (b) on the surface of the internal walls of the flow-through substrate according to (a), wherein the surface defines the interface between the passages and the internal walls, obtaining a slurry-treated substrate;
   (d) optionally drying the slurry-treated substrate obtained in (c);
   (e) calcining the slurry-treated substrate obtained in (c), or the dried slurry-treated substrate obtained in (d), obtaining a coated substrate;
   and optionally
   (c') disposing the slurry obtained in (b) on the surface of the coating disposed on the substrate as obtained in (e);
   (d') optionally drying the slurry-treated substrate obtained in (c');
   (e') calcining the slurry-treated substrate obtained in (c'), or the dried slurry-treated substrate obtained in (d');
   wherein from (e) or (e'), the selective catalytic reduction catalyst is obtained.

55. A selective catalytic reduction catalyst, preferably the selective catalytic reduction catalyst according to any one of embodiments 1 to 33, obtainable or obtained by the process according to any one of embodiments 34 to 54.

56. An exhaust gas treatment system for treating an exhaust gas stream exiting from a diesel engine, comprising a first selective catalytic reduction catalyst according to any one of embodiments 1 to 33 and 55, and one or more of a diesel oxidation catalyst, an ammonia oxidation catalyst, a second selective catalytic reduction catalyst, a filter, preferably a catalyzed soot filter.

57. The exhaust gas treatment system of embodiment 56, wherein
   the first selective catalytic reduction catalyst according to any one of embodiments 1 to 33 and 55, comprises an inlet end and an outlet end, the inlet end of said first selective catalytic reduction catalyst being in fluid communication with and downstream of the diesel engine, wherein the system further comprises
   an ammonia oxidation catalyst having an inlet end and an outlet end;
   a diesel oxidation catalyst having an inlet end and an outlet end;
   a filter, preferably a catalyzed soot filter, having an inlet end and an outlet end;
   wherein the outlet end of the first selective catalytic reduction catalyst is located upstream of the inlet end of the ammonia oxidation catalyst, the outlet end of the ammonia oxidation catalyst is located upstream of the inlet end of the diesel oxidation catalyst, and the outlet end of the diesel oxidation catalyst is located upstream of the inlet end of the filter.

58. The exhaust gas treatment system of embodiment 57, wherein the system further comprises downstream of the outlet end of the filter, a second selective catalytic reduction catalyst, preferably a selective catalytic reduction catalyst according to any one of embodiments 1 to 33 and 55, having an inlet end and an outlet end, and a second ammonia oxidation catalyst having an inlet end and an outlet end, wherein the inlet end of the second ammonia oxidation catalyst is located downstream of the outlet end of the second selective catalytic reduction catalyst.

59. The exhaust gas treatment system of embodiment 56, wherein the system comprises
   a diesel oxidation catalyst having an inlet end and an outlet end, the inlet end of the diesel oxidation catalyst being in fluid communication with and downstream of the diesel engine;
   a filter, preferably a catalyzed soot filter, having an inlet end and an outlet end, wherein the inlet end of the filter is located downstream of the outlet end of the diesel oxidation catalyst;
   wherein the first selective catalytic reduction catalyst according to any one of embodiments 1 to 33 and 55, has an inlet end and an outlet end, the inlet end of said first selective catalytic reduction catalyst is located downstream of the outlet end of the filter.

60. The exhaust gas treatment system of embodiment 59 further comprising an ammonia oxidation catalyst having an inlet end and an outlet end, wherein the inlet end of the ammonia oxidation catalyst is located downstream of the outlet end of the first selective catalytic reduction catalyst.

61. The exhaust gas treatment system of any one of embodiments 56 to 60, wherein the system further comprising one or more fluid injectors, each being located upstream of a selective catalytic reduction catalyst, wherein the fluid is preferably urea.

62. Use of a selective catalytic reduction catalyst according to any one of embodiments 1 to 33 and 55, for the selective catalytic reduction of nitrogen oxides comprised in an exhaust gas stream, preferably from a diesel engine.

63. A method for the selective catalytic reduction of nitrogen oxides, wherein the nitrogen oxides are comprised in an exhaust gas stream, said method comprising (2) providing the exhaust gas stream, preferably from a diesel engine;
(2) passing the exhaust gas stream provided in (1) through a selective catalytic reduction catalyst according to any one of embodiments 1 to 33 and 55.

In the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

The present invention is further illustrated by the following Reference Examples, Comparative Examples, and Examples.

EXAMPLES

Reference Example 1: Determination of Dv90 Values

The particle size distributions were determined by a static light scattering method using Sympatec HELOS equipment, wherein the optical concentration of the sample was in the range of from 5 to 10%.

Reference Example 2: Measurement of the BET Specific Surface Area

The BET specific surface area was determined according to DIN 66131 or DIN ISO 9277 using liquid nitrogen.

Reference Example 3: General Coating Method

In order to coat a flow-through substrate with one or more coatings, the flow-through substrate was immersed vertically in a portion of a given slurry for a specific length of the substrate. In this manner, the washcoat contacted the walls of the substrate. The sample was left in the slurry for a specific period of time, usually for 1-10 seconds. Vacuum was applied to draw the slurry into the substrate. The substrate was then removed from the slurry, and was inverted and excess slurry was removed from the substrate by allowing it to drain from the substrate, then by blowing with compressed air (against the direction of slurry penetration).

Example 1: Vanadium-Based SCR Catalyst (Dual Vanadium Source)

An aqueous vanadium oxalate mixture with a solid content of 11 weight-% was added to distilled water such that the final solid content of the mixture was of 3 weight-%. The amount of vanadium oxalate mixture used was calculated so that the vanadium oxide (from vanadium oxalate), calculated as $V_2O_5$, was present at a loading of 1% of the final loading of the coating in the catalyst after calcination. To this diluted vanadium oxalate mixture, a titania powder ($TiO_2$ 90 weight-% and 10 weight-% of $WO_3$ with a BET specific surface area of 90 $m^2/g$, a Dv90 of between 2 and 8.6 micrometers) was added, such that the final loading of titania+tungsten oxide in the catalyst after calcination was 3.88 $g/in^3$.

Further, an organic dispersant (acrylic polymer) mixture with a solid content of 39 weight-% and a pH of 8 was added to the mixture. The amount of dispersant mixture was calculated as 5% by weight of the total weight of the coating in the catalyst after calcination. The resulting mixture was stirred for several minutes and the pH was adjusted to about 7.0 by adding an ammonium-hydroxide solution. Further, distilled water was added in order to obtain a slurry with a solid content to 45.3 weight-%.

After mixing the slurry for 5 minutes, iron vanadate ($FeVO_4$ having a molar ratio of Fe:V of 1:1) powder was added to the slurry. The amount of iron vanadate used was calculated such that the vanadium (from the iron vanadate), calculated as $V_2O_5$, was present at a loading of 4% of the final loading of the coating in the catalyst after calcination (the loading of $FeVO_4$ was 8.39% of the final loading of the coating in the catalyst after calcination). Afterwards, an aqueous colloidal silica (a solid content of 40 weight-%) was added to the slurry, in an amount such that the final $SiO_2$ loading in the catalyst after calcination was 0.19 $g/in^3$, along with additional distilled water to obtain a final slurry solid content of 43 weight-%.

A portion of the final slurry was disposed over the full length of an uncoated honeycomb cordierite monolith substrate according to the method described in Reference Example 3 (diameter: 26.67 cm (10.5 inches) x length: 15.24 cm (6 inches) cylindrically shaped substrate with 400/$(2.54)^2$ cells per square centimeter and 0.10 millimeter (4 mil) wall thickness). The coated substrate was dried in stages between 110° C. and 130° C. for 30 minutes in total (to remove up to 80% of the water) and calcined in air for 4 hours, of which approximately 30 minutes were at 450° C. The remaining portion of the final slurry was disposed over the full length of the coated substrate, dried in stages between 110° C. and 130° C. for 30 minutes in total (to remove up to 80% of the water) and calcined in air for 4 hours, of which approximately 30 minutes were at 450° C., to obtain a final loading of the coating in the catalyst of 4.5 $g/in^3$, including 3.88 $g/in^3$ of titania+tungsten oxide, 0.045 $g/in^3$ of vanadium (calculated as $V_2O_5$—from vanadium oxalate), 0.377 $g/in^3$ of $FeVO_4$ (including 0.18 $g/in^3$ of vanadium calculated as $V_2O_5$), 0.19 $g/in^3$ of $SiO_2$.

Comparative Example 1: Vanadium-Based SCR Catalyst (Single Vanadium Source)

An organic dispersant (acrylic polymer) mixture with a solid content of 39 weight-% and a pH of 8, was added to distilled water and mixed for 5 minutes. The amount of dispersant mixture was calculated as 5 weight-% of the total weight of the coating in the catalyst after calcination. Afterwards, a titania powder ($TiO_2$ 90 weight-% and 10 weight-% of $WO_3$ with a BET specific surface area of 90 $m^2/g$, a Dv90 of between 2 and 8.6 micrometers) was added to the mixture, such that the final loading of titania+tungsten oxide in the catalyst after calcination was 3.84 $g/in^3$, to form a slurry. The slurry was stirred for several more minutes and the pH was adjusted to about 7 by adding an ammonium-hydroxide solution. Once the pH was of about 7, iron vanadate (FeVO$_4$ having a molar ratio of Fe:V of 1:1) powder was added to the slurry. The amount of iron vanadate used was calculated such that the vanadium oxide (from iron vanadate), calculated as V$_2$O$_5$, was present at a loading of 5% of the final loading of the coating in the catalyst after calcination (the loading of FeVO$_4$ was 10.48% of the final loading of the coating in the catalyst after calcination).

Afterwards, an aqueous colloidal silica (a solid content of 40 weight-%) was added to the slurry, such that the final SiO$_2$ loading was 5% of the final titania+tungsten oxide loading in the catalyst after calcination, along with additional distilled water to obtain a final slurry solid content of 43 weight-%. The pH was checked and adjusted again to 7.0 by adding an ammonium hydroxide solution.

A portion of the final slurry was disposed over the full length of an uncoated honeycomb cordierite monolith substrate according to the method in Reference Example 3 (diameter: 26.67 cm (10.5 inches) x length: 15.24 cm (6 inches) cylindrically shaped substrate with 400/(2.54)$^2$ cells per square centimeter and 0.10 millimeter (4 mil) wall thickness). The coated substrate was dried in stages between 110° C. and 130° C. for 30 minutes total (to remove up to 80% of the water) and calcined in air for 4 hours, of which approximately 30 minutes were at 450° C. The remaining portion of the final slurry was disposed over the full length of the coated substrate, dried in stages between 110° C. and 130° C. for 30 minutes in total (to remove up to 80% of the water) and calcined in air for 4 hours, of which approximately 30 minutes were at 450° C., to obtain a final coating loading of 4.5 g/in$^3$, including 3.84 g/in$^3$ of titania+tungsten oxide, 0.47 g/in$^3$ of FeVO$_4$, 0.19 g/in$^3$ of SiO$_2$.

Comparative Example 2: Vanadium-Based SCR Catalyst (Single Vanadium Source)

The catalyst of Comparative Example 2 was prepared as the catalyst of Comparative Example 1 except that the amount of iron vanadate was calculated such that the loading of FeVO$_4$ was 8.38% of the final loading of the coating in the catalyst after calcination (including a vanadium loading (from iron vanadate), calculated as V$_2$O$_5$, of 4% of the final loading of the coating in the catalyst after calcination). Thus, the final loading of the coating in the catalyst after calcination was of 4.5 g/in$^3$, including 3.93 g/in$^3$ of titania+tungsten oxide, 0.38 g/in$^3$ of FeVO$_4$, 0.196 g/in$^3$ of SiO$_2$.

Comparative Example 3: Vanadium-Based SCR Catalyst (Single Vanadium Source)

The catalyst of Comparative Example 3 was prepared as the catalyst of Comparative Example 1 except that the amount of iron vanadate was calculated such that the loading of FeVO$_4$ was 12.58% of the final loading of the coating in the catalyst after calcination (including a vanadium loading (from iron vanadate), calculated as V$_2$O$_5$, of 6% of the final loading of the coating in the catalyst after calcination) and that the aqueous colloidal silica used, was added such that the final SiO$_2$ loading represented 7.5% of the final titania+tungsten oxide loading in the catalyst after calcination. Thus, the final coating loading in the catalyst after calcination was of 4.5 g/in$^3$, including 3.66 g/in$^3$ of titania+tungsten oxide, 0.57 g/in$^3$ of FeVO$_4$, 0.27 g/in$^3$ of SiO$_2$.

Example 2: Use of the Catalysts of Example 1 and of Comparative Examples 1 to 3—DeNOx The performance of the catalysts of Example 1 and of Comparative Examples 1 to 3 in NOx conversion was measured at different temperatures, namely at 200, 240, 375, 450 and 500° C., (Gas Hourly Space Velocity (GHSV): 40 000 h$^{-1}$ at 200, 240, 375 and 450° C. and GHSV: 80 000 h$^{-1}$ at 500° C.) under fresh and aged conditions (ageing at 550° C. for 50 hours in an oven). During testing ad-blue solution (a mixture of 32.5% urea and 67.5% de-ionized water as described in ISO 22241) was dosed into the exhaust gas, sufficiently upstream of the SCR catalyst to ensure complete mixing and a homogeneous distribution throughout the flow. The amount of ad-blue dosed was calculated based on the normalized stoichiometric ratio (NSR) of the resulting NH$_3$ molar flow versus the calculated NOx molar flow. The ad-blue dosing was adjusted starting from 0.0 step-wise based on the SCR catalyst inlet temperature. At 500° C., the NSR was adjusted from 0.0 to 1.0 to 1.1. At 450° C., 375° C., and 240° C., the NSR was adjusted from 0.0 to 0.4 to 0.6 to 0.8 to 1.0 to 1.1. At 200° C., the NSR was adjusted from 0.0 to 0.8 to 1.0 to 1.1. In all cases, the catalyst was purged of NH$_3$ before being brought to the next load point/temperature. Only maximum deNOx values are reported below in Table 1.

TABLE 1

| | NOx conversion | | | | | | | |
|---|---|---|---|---|---|---|---|---|
| | Example 1 NOx conv. (%) | | Comp. Example 1 NOx conv. (%) | | Comp. Example 2 NOx conv. (%) | | Comp. Example 3 NOx conv. (%) | |
| Temp. (° C.) | Fresh | Aged | Fresh | Aged | Fresh | Aged | Fresh | Aged |
| 200 | 68 | 51 | 48 | 45 | 60 | 41 | 53 | 38 |
| 240 | 96 | 89 | 85 | 85 | 92 | 79 | 88 | 79 |
| 375 | 98 | 98 | 98 | 99 | 98 | 98 | 98 | 98 |
| 450 | 96 | 96 | 97 | 96 | 96 | 96 | 98 | 97 |
| 500 | 89 | 82 | 93 | 89 | 90 | 87 | 82 | 82 |

As may be taken from Table 1, the catalyst of Example 1 (dual-source—5% vanadium) exhibits improved NOx conversions at low temperatures, at 200 and 240° C., under fresh and aged conditions compared to the catalyst of Comparative Example 1 (single source—4% vanadium), to the catalyst of Comparative Example 2 (single source—5% vanadium) and to the catalyst of Comparative Example 3 (single source—6% vanadium). Further, the catalyst of Example 1 exhibits good NOx conversions (from 82 to 98%) under fresh and aged conditions at higher temperatures, said performance being comparable to those of the catalysts of the comparative examples representative of the prior art. Thus, this example demonstrates that the use of vanadium containing selective catalytic reduction catalyst having a dual source of vanadium permits to increase the low temperature deNOx while maintaining great performance at higher temperatures, namely up to 500° C. The example further demonstrates that the catalysts of the invention have an improved thermal stability compared to the catalysts representative of the prior art (Comp. Examples 1-3).

Example 3: Vanadium-Based SCR Catalyst (Dual Vanadium Source)

An aqueous vanadium oxalate mixture with a solid content of 11 weight-% was added to distilled water such that the final solid content of the mixture was of 3 weight-%. The amount of vanadium oxalate used was calculated such that the vanadium oxide (from the vanadium oxalate), calculated as $V_2O_5$, was present at a loading of 2% of the final loading of the coating in the catalyst after calcination. To this vanadium oxalate mixture, a titania powder ($TiO_2$ 90 weight-% and 10 weight-% of $WO_3$ with a BET specific surface area of 90 $m^2/g$, a Dv90 of between 2 and 8.6 micrometers) was added, such that the final loading of titania+tungsten oxide in the catalyst after calcination was 3.84 $g/in^3$.

Further, an organic dispersant (acrylic polymer) mixture with a solid content of 39 weight-% and a pH of 8 was added to the mixture. The amount of dispersant mixture was calculated as 5% by weight of the total weight of the coating in the catalyst after calcination. The resulting mixture was stirred for several minutes and the pH was adjusted to about 7.0 by adding an ammonium-hydroxide solution. Further, distilled water was added in order to obtain a slurry with a solid content to 45.3 weight-%.

After mixing the slurry for 5 minutes, an iron vanadate ($FeVO_4$ having a molar ratio of Fe:V of 1:1) powder was added to the slurry. The amount of iron vanadate used was calculated such that the vanadium (from the iron vanadate), calculated as $V_2O_5$, was present at a loading of 4% of the final loading of the coating in the catalyst after calcination (the loading of $FeVO_4$ was 8.39% of the final loading of the coating in the catalyst after calcination). Afterwards, an aqueous colloidal silica (a solid content of 40%) was added to the slurry, such that the final $SiO_2$ loading after calcination in the catalyst was 0.19 $g/in^3$, along with additional distilled water to obtain a final slurry solid content of 43 weight-%.

A portion of the final slurry was disposed over the full length of an uncoated honeycomb cordierite monolith substrate according to the method in Reference Example 3 (diameter: 26.67 cm (10.5 inches) x length: 15.24 cm (6 inches) cylindrically shaped substrate with $400/(2.54)^2$ cells per square centimeter and 0.10 millimeter (4 mil) wall thickness). The coated substrate was dried in stages between 110° C. and 130° C. for 30 minutes total (to remove up to 80% of the water) and calcined in air for 4 hours, of which approximately 30 minutes were at 450° C. The remaining portion of the final slurry was disposed over the full length of the coated substrate, dried in stages between 110° C. and 130° C. for 30 minutes in total (to remove up to 80% of the water) and calcined in air for 4 hours, of which approximately 30 minutes were at 450° C., to obtain a final loading of the coating in the catalyst of 4.5 $g/in^3$, including 3.84 $g/in^3$ of titania+tungsten oxide, 0.09 $g/in^3$ of vanadium (calculated as $V_2O_5$—from vanadium oxalate), 0.38 $g/in^3$ of $FeVO_4$ (including 0.18 $g/in^3$ of vanadium calculated as $V_2O_5$), 0.19 $g/in^3$ of $SiO_2$.

Example 4: Vanadium-Based SCR Catalyst (Dual Vanadium Source)

An aqueous vanadium oxalate mixture with a solid content of 11 weight-% was added to distilled water such that the final solid content of the mixture was of 3.0 weight-%. The amount of vanadium oxalate used was calculated such that the vanadium oxide (from the vanadium oxalate), calculated as $V_2O_5$, was present at a loading of 2.5% of the final loading of the coating in the catalyst after calcination. To this diluted vanadium oxalate mixture, a titania powder ($TiO_2$ 90 weight-% and 10 weight-% of $WO_3$ with a BET specific surface area of 90 $m^2/g$, a Dv90 of between 2 and 8.6 micrometers) was added, such that the final loading of titania+tungsten oxide in the catalyst after calcination was 4.0 $g/in^3$.

Further, an acrylic based organic dispersant (acrylic polymer) mixture with a solid content of 39 weight-% and a pH of 8 was added to the mixture. The amount of dispersant mixture was calculated as 5% by weight of the final loading of the coating in the catalyst after calcination. The resulting mixture was stirred for several minutes and the pH was adjusted to about 7.0 by adding an ammonium-hydroxide solution. Further, distilled water was added in order to obtain a slurry with a solid content to 45 weight-%.

After mixing the slurry for 5 minutes, iron vanadate ($FeVO_4$ having a molar ratio of Fe:V of 1:1) powder was added to the slurry. The amount of iron vanadate used was calculated such that the vanadium (from the iron vanadate), calculated as $V_2O_5$, was present at a loading of 2% of the final loading of the coating in the catalyst after calcination (the loading of $FeVO_4$ was 4.19% of the final loading of the coating in the catalyst after calcination). Afterwards, an aqueous colloidal silica (a solid content of 40 weight-%) was added to the slurry, such that the final $SiO_2$ loading in the catalyst after calcination was 0.2 $g/in^3$, along with additional distilled water to obtain a final slurry solid content of 43 weight-%.

A portion of the final slurry was disposed over the full length of an uncoated honeycomb cordierite monolith substrate according to the method in Reference Example 3 (diameter: 26.67 cm (10.5 inches) x length: 15.24 cm (6 inches) cylindrically shaped substrate with $400/(2.54)^2$ cells per square centimeter and 0.10 millimeter (4 mil) wall thickness). The coated substrate was dried in stages between 110° C. and 130° C. for 30 minutes total (to remove up to 80% of the water) and calcined in air for 4 hours, of which approximately 30 minutes were at 450° C. The remaining portion of the final slurry was disposed over the full length of the coated substrate, dried in stages between 110° C. and 130° C. for 30 minutes total (to remove up to 80% of the water) and calcined in air for 4 hours, of which approximately 30 minutes were at 450° C., to obtain a final coating loading in the catalyst of 4.5 $g/in^3$, including 4.00 $g/in^3$ of titania+tungsten oxide, 0.11 $g/in^3$ of vanadium (calculated as $V_2O_5$— from vanadium oxalate), 0.19 $g/in^3$ of $FeVO_4$ (including 0.09 $g/in^3$ of vanadium calculated as $V_2O_5$), 0.2 $g/in^3$ of $SiO_2$.

Comparative Example 4: Vanadium-Based SCR Catalyst not According to the Present Invention (Single Vanadium Source)

An aqueous vanadium oxalate mixture with a solid content of 11 weight-% was added to distilled water such that the final solid content of the mixture was 3.1 weight-%. The amount of vanadium oxalate used was calculated such that the vanadium oxide, calculated as $V_2O_5$, was present at a loading of 4% of the final coating loading in the catalyst after calcination. An acrylic based organic dispersant (acrylic polymer) mixture with a solid content of 39 weight-% and a pH of 8 was added forming a mixture. The amount of dispersant mixture was calculated as 5 weight-% of the total weight of the coating in the catalyst after calcination.

A titania powder ($TiO_2$ 87 weight-% with 8 weight-% of $WO_3$ and 5 weight-% of $SiO_2$ with a BET specific surface area of 85 $m^2/g$, a Dv90 of 2.5 micrometers) was added to the obtained mixture, forming a slurry. The final loading of titania+tungsten oxide+silica in the catalyst after calcination was 4.11 $g/in^3$. The pH of the slurry was adjusted to about 7.0 using ammonium hydroxide solution. Additional distilled water was added to bring the solid content of the slurry to 40.6 weight-%. A second organic-based dispersant (organic polymer) mixture was added to the slurry, this one having a solid content of 31 weight-%. This second dispersant mixture was added in the amount of 3.22 weight-% of the total final solid loading of the catalyst. Lastly, an aqueous colloidal silica (a solid content of 40 weight-%) was added to the slurry along with additional distilled water to obtain a final slurry with a solid content of 39 weight-%. The amount of colloidal silica used was calculated such that the final $SiO_2$ loading (from the colloidal silica) was 5% of the final loading of titania+tungsten oxide+silica in the catalyst after calcination. The pH of the aqueous phase of the resulting slurry was checked and adjusted to a pH of about 7 by the addition of ammonium hydroxide.

A portion of the final slurry was disposed over the full length of an uncoated honeycomb cordierite monolith substrate according to the method in Reference Example 3 (diameter: 26.67 cm (10.5 inches) x length: 15.24 cm (6 inches) cylindrically shaped substrate with $400/(2.54)^2$ cells per square centimeter and 0.10 millimeter (4 mil) wall thickness). The coated substrate was dried in stages between 110° C. and 130° C. for 30 minutes total (to remove up to 80% of the water) and calcined in air for 4 hours, of which approximately 30 minutes were at 450° C. The remaining portion of the final slurry was disposed over the full length of the coated substrate, dried in stages between 110° C. and 130° C. for 30 minutes total (to remove up to 80% of the water) and calcined in air for 4 hours, of which approximately 30 minutes were at 450° C., to obtain a final coating in the catalyst of 4.5 $g/in^3$, including 4.11 $g/in^3$ of titania supporting $WO_3$ and $SiO_2$, 0.18 $g/in^3$ of vanadium (calculated as $V_2O_5$), 0.21 $g/in^3$ of $SiO_2$ (from the colloidal silica).

Example 5: Vanadium-Based SCR Catalyst (Dual Vanadium Source)

An aqueous vanadium oxalate solution with a solid content of 11 weight-% was added to distilled water such that the final solid content of the mixture was of 3 weight-%. The amount of vanadium oxalate used was calculated such that the vanadium oxide (from vanadium oxalate), calculated as $V_2O_5$, was present at a loading of 2.5% of the final loading of the coating in the catalyst after calcination. To this diluted vanadium oxalate mixture, a titania powder ($TiO_2$ 87 weight-% with 8 weight-% of $WO_3$ and 5 weight-% of $SiO_2$ with a BET specific surface area of 85 $m^2/g$, a Dv90 of 2.5 micrometers) was added, such that the final loading of titania+tungsten oxide+silica in the catalyst after calcination was 3.82 $g/in^3$.

Further, an acrylic based organic dispersant (acrylic polymer) mixture with a solid content of 39 weight-% was added to the obtained mixture. The amount of dispersant mixture was calculated as 5% by weight of the total weight of the coating in the catalyst after calcination. The resulting mixture was stirred for several minutes and the pH was adjusted to about 7.0 by adding an ammonium-hydroxide solution. Further, distilled water was added in order to obtain a slurry with a solid content to 40.4 weight-%.

After mixing the slurry for 5 minutes, iron vanadate ($FeVO_4$ having a molar ratio of Fe:V of 1:1) powder was added to the slurry. The amount of iron vanadate used was calculated such that the vanadium (from the iron vanadate), calculated as $V_2O_5$, was present at a loading of 4% of the final loading of the coating in the catalyst after calcination (the loading of $FeVO_4$, calculated as $FeVO_4$, was 8.39% of the final loading of the coating in the catalyst after calcination). Afterwards, an aqueous colloidal silica (a solid content of 40 weight-%) was added to the slurry, such that the final $SiO_2$ loading (from the colloidal silica) in the catalyst after calcination was 0.19 $g/in^3$, along with additional distilled water to obtain a final slurry solid content of 40 weight-%.

A portion of the final slurry was disposed over the full length of an uncoated honeycomb cordierite monolith substrate according to the method in Reference Example 3 (diameter: 26.67 cm (10.5 inches) x length: 15.24 cm (6 inches) cylindrically shaped substrate with $400/(2.54)^2$ cells per square centimeter and 0.10 millimeter (4 mil) wall thickness). The coated substrate was dried in stages between 110° C. and 130° C. for 30 minutes total (to remove up to 80% of the water) and calcined in air for 4 hours, of which approximately 30 minutes were at 450° C. The remaining portion of the final slurry was disposed over the full length of the coated substrate, dried in stages between 110° C. and 130° C. for 30 minutes total (to remove up to 80% of the water) and calcined in air for 4 hours, of which approximately 30 minutes were at 450° C., to obtain a final coating loading in the catalyst of 4.5 $g/in^3$, including 3.82 $g/in^3$ of titania+tungsten oxide+silica, 0.11 $g/in^3$ of vanadium (calculated as $V_2O_5$— from vanadium oxalate), 0.38 $g/in^3$ of $FeVO_4$ (including 0.18 $g/in^3$ of vanadium calculated as $V_2O_5$), 0.19 $g/in^3$ of $SiO_2$ (from the colloidal silica).

Example 6: Use of the Catalysts of Examples 3 and 4 and of Comparative Examples 2, 3 and 4—DeNOx The performance of the fresh catalysts of Examples 3 and 4 and of Comparative Examples 2, 3 and 4 in NOx conversion was measured at different temperatures, namely at 200, 240, 375, 450 and 500° C., (Gas Hourly Space Velocity (GHSV): 40 000 $h^{-1}$ at 200, 240, 375 and 450° C. and GHSV: 80 000 $h^{-1}$ at 500° C.). During testing ad-blue solution (a mixture of 32.5% urea and 67.5% de-ionized water as described in ISO 22241) was dosed into the exhaust gas, sufficiently upstream of the SCR catalyst to ensure complete mixing and a homogeneous distribution throughout the flow. The amount of ad-blue dosed was calculated based on the normalized stoichiometric ratio (NSR) of the resulting $NH_3$ molar flow versus the calculated NOx molar flow. The ad-blue dosing was adjusted starting from 0.0 step-wise based on the SCR catalyst inlet temperature. At 500° C., the NSR was adjusted from 0.0 to 1.0 to 1.1. At 450° C., 375° C., and 240° C., the NSR was adjusted from 0.0 to 0.4 to 0.6 to 0.8 to 1.0 to 1.1. At 200° C., the NSR was adjusted from 0.0 to 0.8 to 1.0 to 1.1. In all cases, the catalyst was purged of $NH_3$ before being brought to the next load point/temperature. Only maximum deNOx values are reported below in Table 2.

TABLE 2

| | NOx conversion | | | | |
|---|---|---|---|---|---|
| Temp. (° C.) | Comp. Ex. 2 NOx conv. (%) | Comp. Ex. 3 NOx conv. (%) | Comp. Ex. 4 NOx conv. (%) | Example 3 NOx conv. (%) | Example 4 NOx conv. (%) |
| 200 | 60 | 53 | 56 | 63 | 64 |
| 240 | 92 | 88 | 91 | 93 | 95 |
| 375 | 98 | 98 | 95 | 98 | 98 |
| 450 | 96 | 98 | 85 | 96 | 97 |
| 500 | 90 | 82 | 65 | 87 | 89 |

As may be taken from Table 1, the catalysts of Example 3 (dual vanadium source—6% vanadium oxide) and of Example 4 (dual vanadium source—4.5% vanadium oxide) exhibit improved NOx conversions at low temperatures, at 200 and 240° C., compared to the catalyst of Comparative Example 2 (single vanadium source—5% vanadium oxide), to the catalyst of Comparative Example 3 (single vanadium source—6% vanadium oxide) and to the catalyst of Comparative Example 4 (single vanadium source—4% vanadium oxide). Further, the catalysts of Examples 3 and 4 exhibit good NOx conversions (from 89 to 98%), said performance being comparable or better to those of the catalysts of the comparative examples representative of the prior art. Thus, this example demonstrates that the use of vanadium-containing selective catalytic reduction catalyst having a dual source of vanadium permits to increase the low temperature deNOx while maintaining great performance at higher temperatures, namely up to 500° C.).

The invention claimed is:

1. A selective catalytic reduction catalyst for the treatment of an exhaust gas of a diesel engine, the catalyst comprising:
   a flow-through substrate comprising an inlet end, an outlet end, a substrate axial length extending from the inlet end to the outlet end, and a plurality of passages defined by internal walls of the flow-through substrate extending therethrough; and
   a coating disposed on the surface of the internal walls of the substrate,
   wherein the surface defines the interface between the passages and the internal walls,
   wherein the coating comprises a vanadium oxide supported on an oxidic material comprising titania, and
   wherein the coating further comprises a mixed oxide of vanadium and at least one selected from the group consisting of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum, and antimony.

2. The selective catalytic reduction catalyst of claim 1, wherein the oxidic material further comprises one or more oxides.

3. The selective catalytic reduction catalyst of claim 1, wherein the oxidic material comprises from 75 to 100 weight-% titania.

4. The selective catalytic reduction catalyst of claim 1, wherein the mixed oxide is a mixed oxide of vanadium and at least one selected from the group consisting of iron, erbium, bismuth, aluminum, and antimony.

5. The selective catalytic reduction catalyst of claim 1, wherein the vanadium oxide, calculated as $V_2O_5$, is present in the catalyst at a loading (lv1)/(g/in$^3$),
wherein the vanadium of the mixed oxide, calculated as $V_2O_5$, is present in the catalyst at a loading (lv2)/(g/in$^3$), and
wherein the ratio (lv1):(lv2) is in the range of from 0.1:1 to 3:1.

6. The selective catalytic reduction catalyst of claim 1, wherein the amount of vanadium comprised in the coating, the vanadium being calculated as $V_2O_5$, is in the range of from 2.5 to 8 weight-%, based on the total weight of the coating.

7. The selective catalytic reduction catalyst of claim 1, wherein in the catalyst, the oxidic material is present at a loading in the range of from 1 to 8 g/in$^3$.

8. The selective catalytic reduction catalyst of claim 1, wherein the coating further comprises an oxidic binder.

9. The selective catalytic reduction catalyst of claim 1, wherein in the catalyst, the coating is present at a loading in the range of from 1.5 to 10 g/in$^3$.

10. The selective catalytic reduction catalyst of claim 1, wherein the coating comprises two or more coats.

11. A process for preparing a selective catalytic reduction catalyst, the process comprising:
   (a) providing a flow-through substrate comprising an inlet end, an outlet end, a substrate axial length extending from the inlet end to the outlet end and a plurality of passages defined by internal walls of the flow-through substrate extending therethrough;
   (b) providing a slurry comprising:
      a solution of vanadium oxide,
      a powder of an oxidic material comprising titania, water, and
      a powder of a mixed oxide of vanadium and a least one selected from the group consisting of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum, and antimony;
   (c) disposing the slurry obtained in (b) on the surface of the internal walls of the flowthrough substrate according to (a), wherein the surface defines the interface between the passages and the internal walls, obtaining a slurry-treated substrate;
   (d) optionally drying the slurry-treated substrate obtained in (c);
   (e) calcining the slurry-treated substrate obtained in (c), or the dried slurry-treated substrate obtained in (d), obtaining a coated substrate;
   and optionally
   (c') disposing the slurry obtained in (b) on the surface of the coating disposed on the substrate as obtained in (e);
   (d') optionally drying the slurry-treated substrate obtained in (c');
   (e') calcining the slurry-treated substrate obtained in (c'), or the dried slurry-treated substrate obtained in (d');
   wherein from (e) or (e'), the selective catalytic reduction catalyst is obtained.

12. The process of claim 11, wherein (b) comprises:
   (b.1) mixing the solution of vanadium oxide, water, and the powder of an oxidic material comprising titania, obtaining a slurry;
   (b.2) adjusting the pH of the aqueous phase of the slurry obtained in (b.1) to a value in the range of from 6 to 8; and
   (b.3) adding the powder of a mixed oxide of vanadium and at least one selected from the group consisting of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum, and antimony, to the slurry obtained in (b.2).

13. A selective catalytic reduction catalyst obtained by the process of claim 11.

14. An exhaust gas treatment system for treating an exhaust gas stream exiting from a diesel engine, comprising:
   a first selective catalytic reduction catalyst according to claim 1, and
   at least one selected from the group consisting of a diesel oxidation catalyst, an ammonia oxidation catalyst, a second selective catalytic reduction catalyst, a filter, and a catalyzed soot filter.

15. A method for the selective catalytic reduction of nitrogen oxides, in an exhaust gas stream, the method comprising
   passing the exhaust gas stream through a selective catalytic reduction catalyst according to claim 1.

* * * * *